US012763554B2

(12) United States Patent
Van Riel

(10) Patent No.: US 12,763,554 B2
(45) Date of Patent: Oct. 13, 2026

(54) DEVICE FOR PROVIDING ENHANCED ELECTRICAL PERFORMANCE OF A CONNECTOR

(71) Applicant: PPC BROADBAND, INC., East Syracuse, NY (US)

(72) Inventor: Robert Van Riel, East Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 255 days.

(21) Appl. No.: 18/138,939

(22) Filed: Apr. 25, 2023

(65) Prior Publication Data

US 2023/0344205 A1 Oct. 26, 2023

Related U.S. Application Data

(60) Provisional application No. 63/334,568, filed on Apr. 25, 2022.

(51) Int. Cl.
*H02G 1/00* (2006.01)
*H01R 24/40* (2011.01)
*H01R 43/28* (2006.01)

(52) U.S. Cl.
CPC ............ *H02G 1/005* (2013.01); *H01R 24/40* (2013.01); *H01R 43/28* (2013.01)

(58) Field of Classification Search
CPC ...... H02G 1/005; H02G 1/1224; H01R 43/28; H01R 24/40; B23D 29/023; B23D 33/006; Y01T 83/42

(Continued)

(56) References Cited

U.S. PATENT DOCUMENTS 1,623,689 A * 4/1927 Lind .......................... B25B 7/00 269/259
2,288,385 A * 6/1942 Beard ...................... B21J 15/50 30/226

(Continued)

FOREIGN PATENT DOCUMENTS

DE 29516741 U1 1/1996
DE 29706615 U1 7/1997

OTHER PUBLICATIONS

International Search Report and Written Opinion dated Aug. 1, 2023 in corresponding International Application No. PCT/US2023/019746, 17 pages.

(Continued)

*Primary Examiner* — Ghassem Alie
(74) *Attorney, Agent, or Firm* — MH2 Technology Law Group LLP

(57) ABSTRACT

A tool configured to cut a pin of a cable connector that may include a cutter portion and a gauge portion. The cutter portion may be configured to receive a pin of a cable connector to be cut. The gauge portion may be configured to include a receiving portion that is configured to receive a pin of a cable connector. The gauge portion may be configured to rotate relative to the cutter portion around an axis. The gauge portion may include a gauge thickness dimension that is configured to correspond to a predetermined cut length of the pin. The gauge portion also may be configured to permit the cutter portion to cut the pin received by the receiving portion to at least one predetermined length that is needed for an installation so as to provide uniform electrical performance of the connector, which may be a coaxial or hardline connector.

35 Claims, 6 Drawing Sheets

(58) Field of Classification Search
USPC ........ 30/163, 131, 226, 233, 261, 244, 90.1; 81/9.4, 426, 426.5, 186, 418; 7/107
See application file for complete search history.

(56) References Cited

U.S. PATENT DOCUMENTS

| | | | | | |
|---|---|---|---|---|---|
| 2,348,877 | A | | 5/1944 | Beard | |
| 2,494,996 | A | * | 1/1950 | Geddes | B21J 15/50 30/226 |
| 2,527,735 | A | * | 10/1950 | Johnson | B21J 15/50 30/252 |
| 2,543,018 | A | * | 2/1951 | Wallace | B23D 29/023 30/131 |
| 3,309,768 | A | | 3/1967 | Thompson | |
| 3,370,353 | A | * | 2/1968 | Weissman | B23D 29/023 30/131 |
| 3,840,989 | A | * | 10/1974 | Hexdall | B23D 29/023 30/233 |
| 3,947,905 | A | | 4/1976 | Neff | |
| 4,070,898 | A | * | 1/1978 | Earle | F02P 17/00 72/409.13 |
| 4,228,585 | A | * | 10/1980 | Nelson | A45D 29/02 30/29 |
| 4,835,862 | A | | 6/1989 | Phillips | |
| 5,172,620 | A | | 12/1992 | Faust | |
| 8,296,924 | B2 | | 10/2012 | Dierks et al. | |
| 9,486,929 | B2 | * | 11/2016 | Behlen | B23D 29/023 |
| 10,992,117 | B2 | | 4/2021 | Fackler et al. | |
| 11,502,485 | B2 | | 11/2022 | Holland-Moritz et al. | |
| 2003/0110642 | A1 | | 6/2003 | Still | |
| 2005/0115074 | A1 | | 6/2005 | Gialenios et al. | |
| 2010/0095463 | A1 | | 4/2010 | Yang | |
| 2018/0226775 | A1 | | 8/2018 | Vigil | |

OTHER PUBLICATIONS

Rennsteig Werkzeuge GmbH, "Miniature wire cutter and strand trimming tool," Product Data Sheet, Oct. 2, 2022, 1 page.
Greenlee, "Heavy-Duty Cable Cutter, 17-1/2"" Oct. 27, 2020, 1 page.
Greenlee, "Hand-Held Cable Cutter," Oct. 23, 2020, 1 page.

* cited by examiner

DEVICE FOR PROVIDING ENHANCED ELECTRICAL PERFORMANCE OF A CONNECTOR

CROSS-REFERENCE TO RELATED APPLICATION

This application claims the benefit of U.S. Provisional Application No. 63/334,568 filed Apr. 25, 2022, the disclosure of which is hereby incorporated by reference herein in its entirety.

BACKGROUND

The present invention relates generally to connectors for terminating coaxial cable. More particularly, the present invention relates to a tool that is configured to accurately cut a pin of a connector, such as a hardline or semi-rigid coaxial cable connector.

Various types of cables are commonly used in the cable television industry to carry cable TV signals to television sets in homes, businesses, and other locations. For instance, a hardline coaxial cable may be used to carry the signals in distribution systems exterior to these locations and a flexible coaxial cable is then often used to carry the signals within the interior of these locations. Hardline or semi-rigid coaxial cable also may be used where a high degree of radio-frequency (RF) shielding is required.

A hardline cable may include a solid wire core or center conductor, typically of copper or copper-clad aluminum, surrounded by a solid tubular outer conductor. The outer conductor may be made of copper or aluminum. Dielectric material or insulation may separate the center and outer conductors. The outer conductor may be covered with a cable jacket or sheath of plastic to provide protection against corrosion and weathering.

Threaded cable connectors may be employed to provide a secure connection between the coaxial cable (through the connector) to a device, cooperating connector, or other termination point of the cable. Some connectors may provide a pin that extends from the connector and is configured to be received by a pin-receiving portion of the device, cooperating connector, or other termination point of the cable. The above referenced, and other, connectors can provide an electrically conductive connection between the center conductor of the coaxial cable and a gripping portion in a pin assembly that includes the pin. In some applications, the length of the pin is critical to optimizing the electrical connection between the connector and the device, cooperating connector, or other termination point of the cable.

It may be desirable to provide a device that is configured to cut the pin of a coaxial cable connector to a predetermined length that is needed for an installation so as to provide uniform electrical performance of the coaxial cable connector.

SUMMARY

A tool in accordance with embodiments of the disclosure may have a positioning portion that has a gauge portion that may comprise one or more gauge portions. Each gauge portion may be configured to permit a cutting portion to cut a pin of a coaxial cable connector received by a receiving portion to a predetermined length that is needed for an installation so as to provide uniform electrical performance of the connector during operation of the connector.

Embodiments of the disclosure may include a tool that is configured to quickly and accurately cut the pin of a connector to optimize the electrical connection between the pin and the device, cooperating connector, or other termination point of the cable.

According to aspects of the disclosure, a tool that is configured to cut a pin of a connector may include: a cutter portion that may include a first gripping portion that may include a cutting portion, and a second gripping portion that may be configured to be pivotally attached to the first gripping portion and may include a cutting surface; a positioning portion that may include a gauge portion; and an attaching member that may be configured to attach the positioning portion to the cutter portion. The cutting surface may be configured to position a pin of a connector to be cut between the cutting surface and the cutting portion; the gauge portion may include a receiving portion that may be configured to receive a pin of a connector; the attaching member may be configured to extend along a central axis that may extend along a central axis direction; the positioning portion may be configured to rotate relative to the cutter portion around the central axis during tool operation; the gauge portion may have a gauge thickness dimension that may be configured to extend in a direction that is predominantly parallel to the central axis direction; the gauge thickness dimension of the gauge portion may be configured to correspond to a predetermined cut length of a pin of a connector; and the gauge portion may be configured to permit the cutter portion to cut a pin of a connector received by the receiving portion to a predetermined length that is needed for an installation so as to provide uniform electrical performance of the connector during operation of the connector.

In some embodiments, the predetermined cut length may equal the gauge thickness dimension of the gauge portion plus a distance between an edge of the cutting portion and the gauge portion.

In some embodiments, the receiving portion may include a through hole that may be configured to extend in a direction predominantly parallel to the central axis direction.

In some embodiments, the gauge portion may include a first gauge portion, the positioning portion may include a second gauge portion, and the second gauge portion may include a second gauge thickness dimension that may be different from the first gauge thickness dimension of the first gauge portion.

In some embodiments, the positioning portion may include a marking portion that indicates a thickness of the gauge portion.

In some embodiments, the marking portion may be configured to provide a measurement of the predetermined cut length.

In some embodiments, the positioning portion may be configured to be rotated to align the receiving portion with a gap between the cutting portion and the cutting surface.

In some embodiments, the gauge portion may include a recess portion that may be configured to allow at least a portion of the receiving portion to pass there through, and the recess portion may be configured to receive a portion of a connector other than a pin.

In some embodiments, the first and second gripping portions may be configured to move toward each other such that the cutting portion cuts a pin of a connector against the cutting surface to reduce a length of a pin of a connector to the predetermined cut length.

In some embodiments, the cutting portion may be a cutting blade.

In some embodiments, the connector may be a coaxial cable connector.

In some embodiments, the connector may be a hardline connector.

Embodiments of the disclosure may include a tool that may be configured to cut a pin of a connector, including: a cutter portion; and a positioning portion comprising a gauge portion. The cutter portion may be configured to position a pin of a connector to be cut by the cutter portion; the gauge portion may comprise a receiving portion that may be configured to receive a pin of a connector; the positioning portion may be configured to extend along an axis that may extend along a positioning portion axis direction; the positioning portion may be configured to rotate relative to the cutter portion around the axis; the gauge portion may have a gauge thickness dimension that may extend in a direction that may be predominantly parallel to the positioning portion axis direction; the gauge thickness dimension of the gauge portion may be configured to correspond to a predetermined cut length of a pin of a connector; and the gauge portion may be configured to permit the cutter portion to cut a pin of a connector received by the receiving portion to a predetermined or preset length that may be needed for a connector installation so as to provide uniform electrical performance of the connector.

Some embodiments may further include an attaching portion that may be configured to attach the positioning portion to the cutter portion.

In some embodiments, the cutter portion may include a cutting portion that may be configured to be pivotably attached to a cutting support portion.

In some embodiments, the cutting portion may be a cutting blade.

In some embodiments, the predetermined cut length equals the thickness of the gauge portion plus a distance between a cutting edge of the cutting portion and the gauge portion.

In some embodiments, the receiving portion may be configured to extend in a direction that is predominantly parallel to the positioning portion axis direction.

In some embodiments, the gauge portion may include a first gauge portion having a first gauge thickness dimension, the positioning portion may include a second gauge portion having a second gauge thickness dimension, and the first gauge thickness dimension may be greater than the second gauge thickness dimension.

In some embodiments, the connector may be a coaxial cable connector.

In some embodiments, the connector may be a hardline connector.

Embodiments of the disclosure may include a tool that may be configured to cut a pin of a connector, including: a cutter portion; and a gauge portion. The cutter portion may be configured to receive a pin of a connector to be cut in the cutter portion; the gauge portion may be configured to include a receiving portion configured to receive a pin of a connector; the positioning portion may be configured to rotate relative to the cutter portion around a positioning portion axis that may extend in a first direction; the gauge portion may include a gauge thickness dimension that may be configured to correspond to a predetermined cut length of a pin of a connector; and the gauge portion may be configured to permit the cutter portion to cut a pin of a connector received by the receiving portion to a predetermined length that may be needed for an connector installation so as to provide uniform electrical performance of the connector.

Some embodiments further include a positioning portion, and the positioning portion may include the gauge portion, the gauge portion may include a first gauge portion; the positioning portion may include a second gauge portion, and a thickness of the second gauge portion and the thickness of the first gauge portion may be different.

In some embodiments, the thickness of the gauge portion may be in a direction parallel to the axis.

In some embodiments, the cutter portion may include a first gripping portion and a second gripping portion, and wherein the first and second gripping portions may be configured to move toward each other such that a cutting blade cuts a pin of a connector against a cutting surface so as to reduce a length of a pin of a connector to the predetermined cut length.

In some embodiments, the receiving portion may be configured to extend in a direction that may be at least predominantly parallel to the axis.

In some embodiments, the connector may be a coaxial cable connector.

In some embodiments, the connector may be a hardline connector.

According to various aspects of the disclosure, a tool that is configured to cut a pin of a coaxial cable connector may include a first cutting portion that may include a first gripping portion that may include a cutting blade, and a second gripping portion that may be configured to be pivotally attached to the first gripping portion. The second gripping portion also may comprise a second cutting portion, a positioning portion that may include a gauge portion, and an attaching portion that may be configured to attach the positioning portion to the first cutting portion. The second cutting portion may be configured to position a pin of a coaxial cable connector to be cut between the second cutting portion and the cutting blade. The gauge portion may comprise a receiving portion that may be configured to receive a pin of a coaxial cable connector. The attaching portion may extent along a central axis. The positioning portion may be configured to rotate relative to the first cutting portion around the central axis. The gauge portion may have a thickness in a direction parallel to the central axis that may be configured to correspond to a predetermined cut length of a pin of a coaxial cable connector. The gauge portion may be configured to permit the first cutting portion to cut a pin of a coaxial cable connector received by the receiving portion to a predetermined length that is needed for an installation so as to provide uniform electrical performance of the coaxial cable connector.

In some embodiments, the predetermined cut length may equal the thickness of the gauge portion plus a distance between an edge portion of the cutting blade and the gauge portion.

In some embodiments, the receiving portion is a through hole portion, opening portion, or a pin engaging portion, and the through hole portion, opening portion or pin engaging portion may be configured to extend in a direction parallel to the central axis.

In some embodiments, the gauge portion may comprise a first gauge portion. The positioning portion may comprise a second gauge portion. A thickness of the second gauge portion and the thickness of the first gauge portion may be different from one another.

In some embodiments, the positioning portion may include a marking portion that may correspond to the gauge portion.

In some embodiments, the marking portion may be a measurement of the predetermined cut length.

In some embodiments, the positioning portion may be configured to be rotated to align the receiving portion with a gap portion between the cutting blade and the cutting surface.

In some embodiments, the gauge portion may comprise a recess portion through which the receiving portion, or a portion thereof, may pass through, entirely or a portion thereof. The recess portion may be configured to receive a portion of a coaxial cable connector other than a pin.

In some embodiments, the first and second gripping portions may be configured to move toward each other such that the cutting blade cuts a pin of a coaxial cable connector against the second cutting portion to reduce a length of a pin of a coaxial cable connector to a predetermined cut length that may include one or more predetermined cut lengths.

According to various aspects of the disclosure, a tool that is configured to cut a pin of a coaxial cable connector may include a cutting portion and a positioning portion comprising a gauge portion. The cutting portion may be configured to position a pin of a coaxial cable connector so as to be cut in the cutting portion. The gauge portion may comprise a receiving portion that may be configured to receive a pin of a coaxial cable connector. The positioning portion may extend relative to an axis. The positioning portion may configured to rotate relative to the cutting portion around the axis. The gauge portion may have a gauge thickness portion that extends in a direction parallel to the axis. The gauge thickness portion may be configured to correspond to a predetermined cut length of a pin of a coaxial cable connector. The gauge portion may be configured to permit the cutting portion to cut a pin of a coaxial cable connector received by the receiving portion to a predetermined length that is needed for an installation so as to provide uniform electrical performance of the coaxial cable connector during operation of the connector.

Some embodiments further may include an attaching portion that may be configured to attach the positioning portion to the cutting portion.

In some embodiments, the cutting portion may comprises a cutter portion and a cutting support portion that may be configured to be pivotally attached to the cutter portion.

In some embodiments, the predetermined cut length may equal the gauge thickness portion plus a distance between a cutting edge of the cutting portion and the gauge portion.

In some embodiments, the receiving portion may be configured to extend in a direction parallel to the axis.

In some embodiments, the gauge portion may comprise a first gauge portion, the positioning portion may comprise a second gauge portion, and the second gauge portion may have a second thickness that is different from a first thickness of the first gauge portion.

According to various aspects of the disclosure, a tool that is configured to cut a pin of a coaxial cable connector may include a cutting portion and a gauge portion. The cutting portion may be configured to receive a pin of a coaxial cable connector so as to be cut in the cutting portion. The gauge portion may be configured to include a receiving portion that may be configured to receive a pin of a coaxial cable connector. The positioning portion may be configured to rotate relative to the cutting portion around an axis. The gauge portion may include a thickness that may be configured to correspond to a predetermined cut length of a pin of a coaxial cable connector. The gauge portion may be configured to permit the cutting portion to cut a pin of a coaxial cable connector received by the receiving portion to a predetermined length that is needed for an installation so as to provide uniform electrical performance of the coaxial cable connector during operation of the connector.

Some embodiments further include a positioning portion; the positioning portion comprises the gauge portion; the gauge portion is a first gauge portion; the positioning portion comprises a second gauge portion, and a thickness of the second gauge portion and the thickness of the first gauge portion are different.

In some embodiments, the thickness of the gauge portion is in a direction parallel to the axis.

In some embodiments, the cutting portion comprises a first gripping portion and a second gripping portion; and the first and second gripping portions are configured to move toward each other such that a cutting blade cuts a pin of a coaxial cable connector against a cutting surface to reduce a length of a pin of a coaxial cable connector to the predetermined cut length.

In some embodiments, the receiving portion is configured to extend in a direction parallel to the axis.

Although embodiments of the disclosure are described with reference to a hardline connector, the features of the disclosure are also applicable to any coaxial cable connector that includes a pin.

Various aspects of the tool, as well as other embodiments, objects, features and advantages of this disclosure, will be apparent from the following detailed description of illustrative embodiments thereof, which is to be read in conjunction with the accompanying drawings.

DETAILED DESCRIPTION OF EMBODIMENTS

A tool in accordance with embodiments of the disclosure has a positioning portion that has a plurality of gauge portions. The plurality of gauge portions facilitate cutting the pin to a predetermined length that is needed for a particular installation and therefore provides repeatability and uniformity of pin length that result in uniform electrical performance of the coaxial cable connector.

Figure 1:
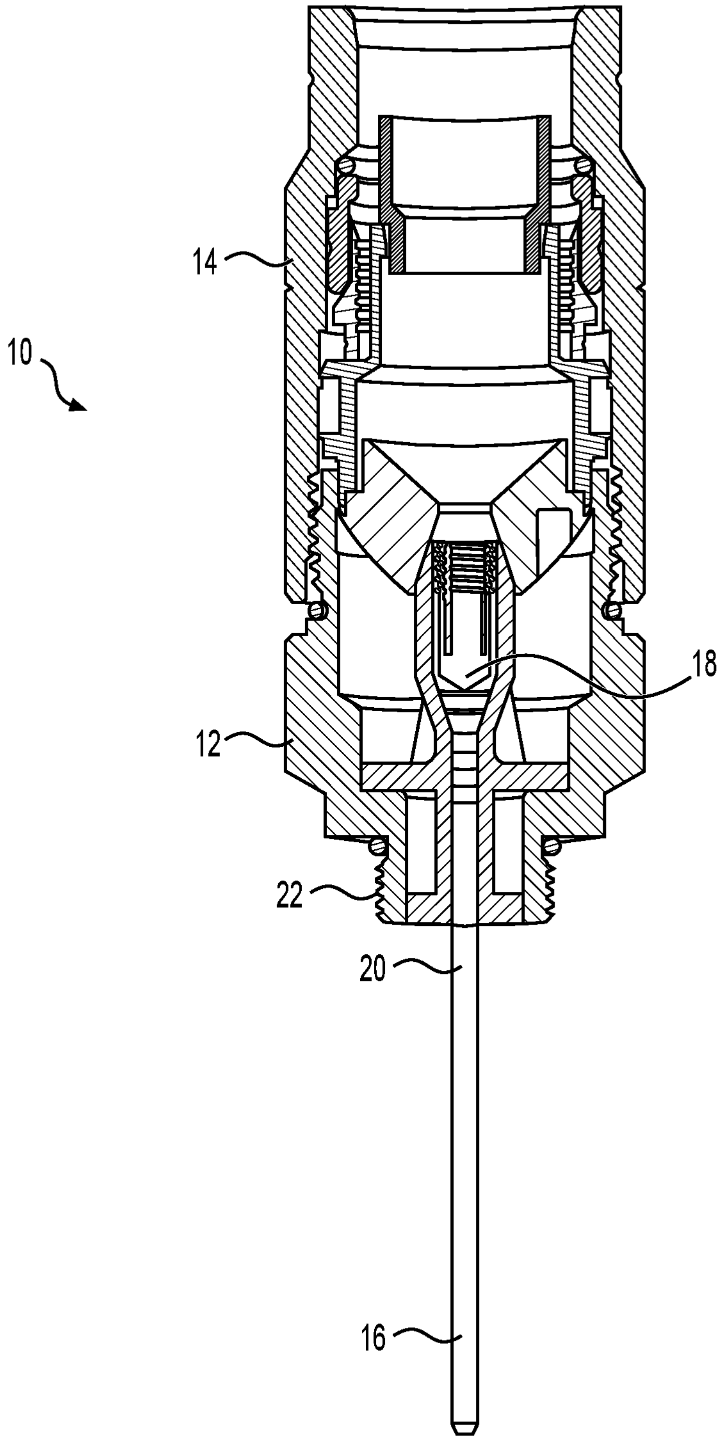
FIG. 1 is a side cross-sectional view of an exemplary hardline connector having a pin.

Referring to FIG. 1, an exemplary connector 10 is depicted. The connector 10 is configured for hardline or semi-rigid coaxial cables. In this example, the connector 10 includes a front nut assembly 12 and a back nut assembly 14 that are configured to be removably connected to one another while providing both an electrical and mechanical connection therebetween.

A coaxial cable (not shown), for example, a hardline coaxial cable, is inserted into the rearward end of the back nut assembly 14 of the connector 10. Coaxial cables generally include a solid center conductor typically formed from a conductive metal, such as copper, copper clad aluminum, copper clad steel, or the like capable of conducting electrical signals therethrough. Surrounding the cable center conductor is a cable dielectric, which insulates the cable center conductor to minimize signal loss. The cable dielectric also maintains a spacing between the cable center conductor and a cable outer conductor or shield. The cable dielectric is often a plastic material, such as a polyethylene, a fluorinated plastic material, such as a polyethylene or a polytetrafluoroethylene, a fiberglass braid, or the like. The cable shield or outer conductor is typically made of metal, such as aluminum or copper, and is often extruded to form a hollow tubular structure with a solid wall having a smooth exterior surface. An insulative cable jacket may surround the cable outer conductor to further seal the coaxial cable. The cable jacket is typically made of plastic, such as polyvinylchloride, polyethylene, polyurethane, or polytetrafluoroethylene.

The connector 10 includes a plurality of components generally having a coaxial configuration about an axis defined by the center conductor of the coaxial cable. In this example, the front nut assembly 12 includes a front body housing supporting a pin assembly 20 therein. Specifically, the front nut assembly 12 is formed with an axial bore configured to cooperatively contain the pin assembly 20 and is made from an electrically conductive material such as aluminum, brass, or the like. The front nut assembly 12 is formed with an external threaded portion 22 at its forward end that is configured to cooperate with devices located in the field that receive the forward end of the pin assembly 20. A portion of the exterior perimeter of the front nut assembly 12 may be provided with a hexagonal shape to accommodate the use of tools during installation of the connector 10. In this example, the pin assembly 20 includes a gripping portion 18 that receives and grips the center conductor of the coaxial cable, and a pin 16 that extends from the front nut assembly 12. The back nut assembly 14 of the connector 10 is provided, at its rearward end, with an axial bore dimensioned to receive the outside diameter of the coaxial cable in snug fitting relationship. The center conductor of the coaxial cable extends from the back nut assembly 14 into the gripping portion 18 of the pin assembly 20 such that an electrically conductive path is established between the center conductor of the coaxial cable and the pin 16.

In particular applications, an accurate and uniform length for the pin 16 is desirable for optimum performance of the connector 10. In particular, in applications where the connector 10 is used to transmit higher frequency signals (such as, for example, 3 GHz signals), a small difference between a desired (or specified) pin length and the actual cut pin length can result in a degradation in performance of the connector. As a result, a tool that allows a technician to accurately and quickly cut the pin 16 to the desired length can greatly reduce the chances for degradation of performance in a coaxial cable system while also increasing productivity.

Figure 2:
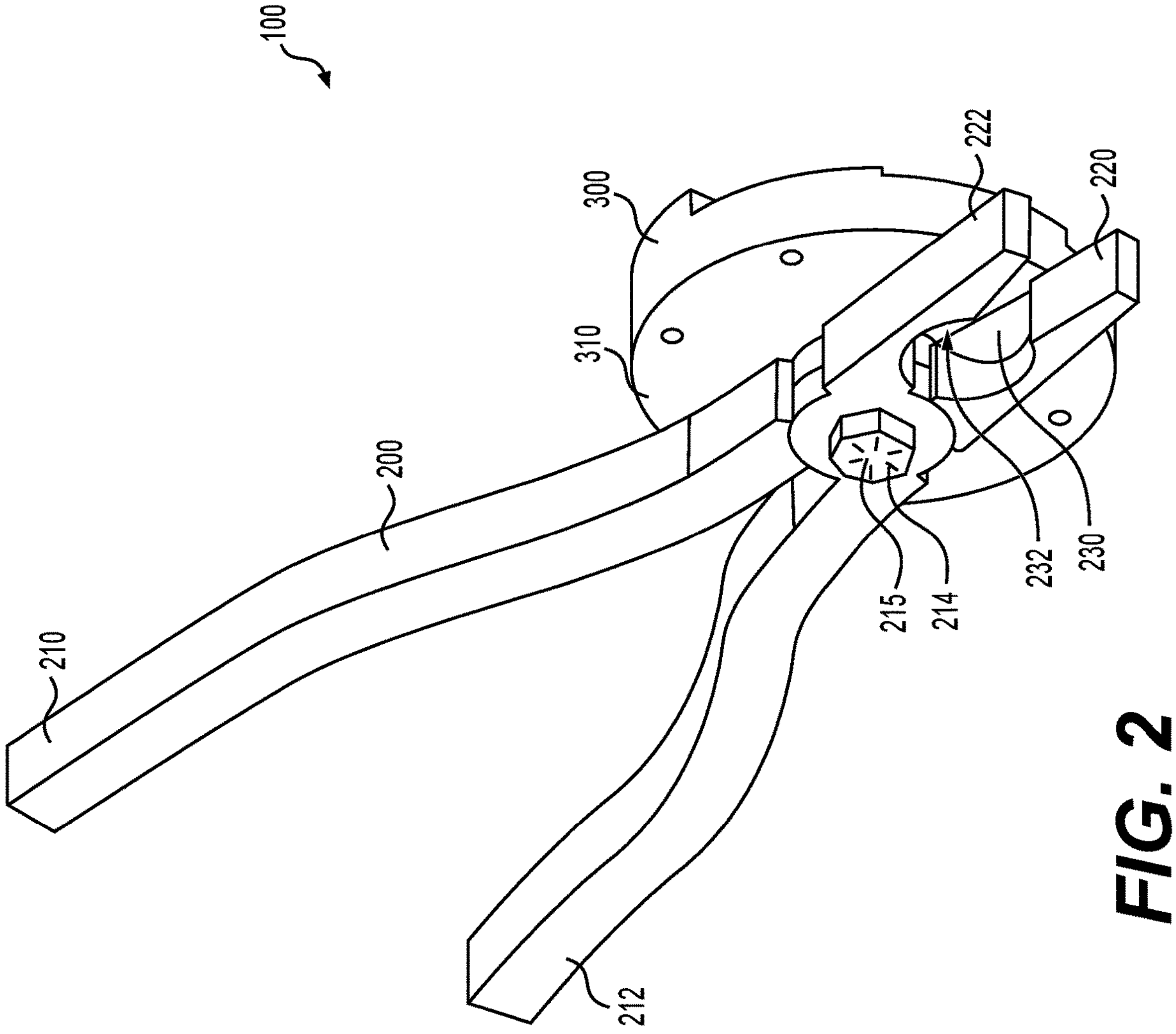
FIG. 2 is a perspective view of a cutting tool in accordance with embodiments of the disclosure.
Figure 3:
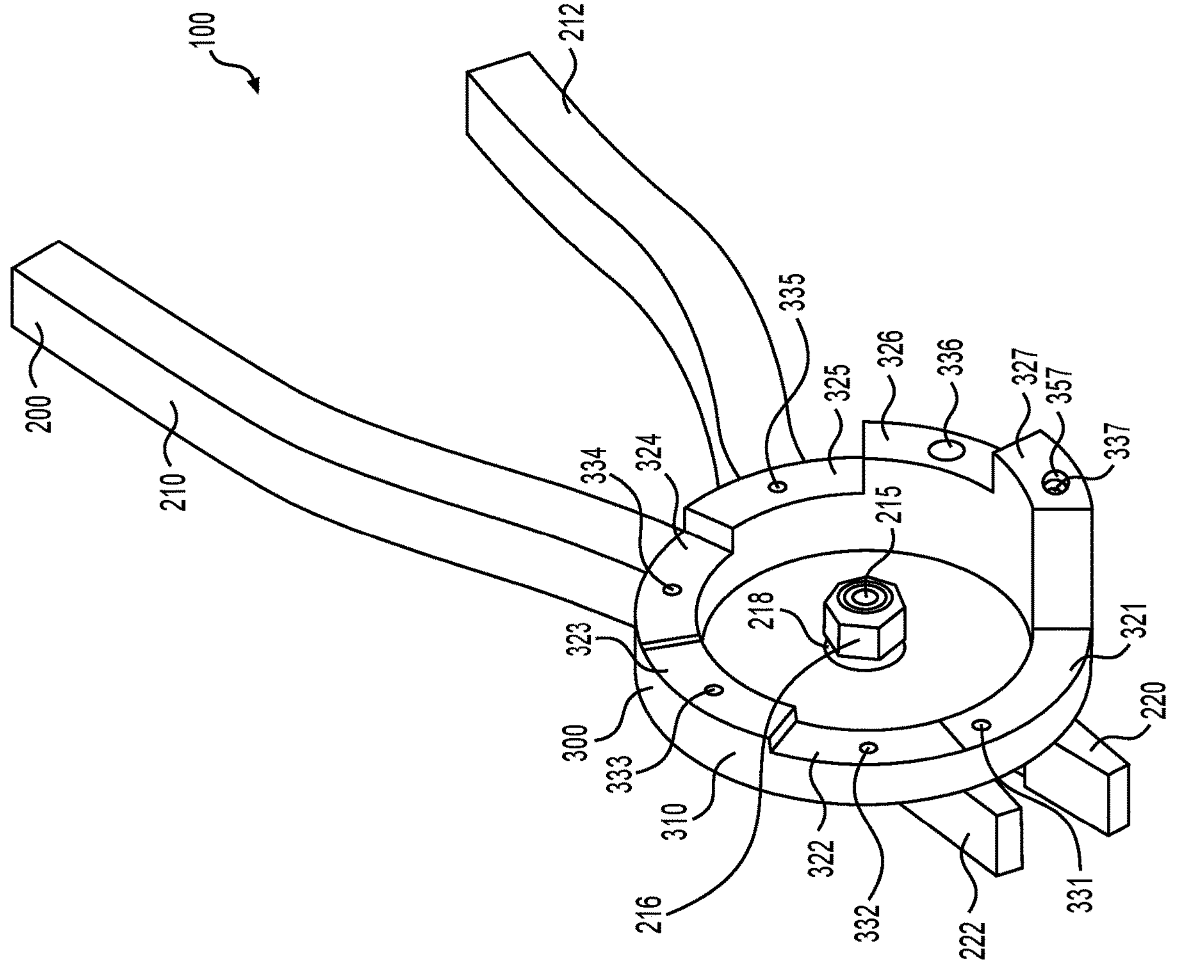
FIG. 3 is a perspective view of the cutting tool of FIG. 1.

FIGS. 2 and 3 show perspective views of a coaxial cable pin cutting tool 100 having a selection mechanism that allows accurate selection of a cut pin length from a plurality of standard pin lengths. In this example, the tool 100 has a cutting portion 200 that includes a first gripping portion such as, for example, a first arm 210 and a second gripping portion such as, for example, a second arm 212 that are pivotably connected to each other by an attaching member 214. In some embodiments, the attaching member 214 includes a bolt 215, a washer 218 and a nut 216 (as shown in FIG. 2), or some other mechanism that connects the first arm 210 to the second arm 212 such that first arm 210 and the second arm 212 are pivotable relative to each other. In the example shown in FIGS. 2 and 3, the first arm 210 has a cutting jaw 220 including a cutting blade 230 configured to cut pin 16. The second arm 212 has a cutting jaw 222 including a cutting surface 232 that is positioned opposite to the cutting blade 230. The cutting surface 232 can, for example, be formed as a flat surface or as a second cutting blade. In operation, when the first arm 210 and the second arm 212 are moved toward each other by a user, the cutting blade 230 and the cutting surface 232 are moved toward each other to cut the pin 16. In some embodiments, the cutting blade 230 and the cutting surface 232 contact each other at a fully closed position of the tool 100. In other embodiments, the cutting blade 230 and the cutting surface 232 approach but do not contact each other at a fully closed position of the tool 100.

The tool 100 has a positioning portion 300 that provides a plurality of stops against which a user positions a portion of the connector 10 such as, for example, a forward surface of the front nut assembly 12 of the connector 10 (which corresponds to the base of the pin 16) to properly position the pin 16 in the tool 100 for cutting. In this example, positioning portion 300 has seven gauge portions 321, 322, 323, 324, 325, 326, 327 each having a different thickness in a direction parallel to a central axis of the bolt 215. In this example, the positioning portion 300 has a planar surface 310 on a side opposite to the guide portions. Each of the gauge portions 321, 322, 323, 324, 325, 326, 327 has a receiving portion such as, for example, a through hole 331, 332, 333, 334, 335, 336, 337 that is configured to receive the pin 16. In embodiments, one or more of the through holes is configured to extend in a direction parallel to (or predominantly parallel to) a rotational (or central) axis, extending for example along a central axis direction, of the positioning portion 300. The term "predominantly parallel to" in this context means within 10 degrees. The positioning portion 300 is configured to rotate relative to the first and second arms 210, 212 so that the desired through hole is aligned with between the cutting blade 230 and the cutting surface 232. In embodiments, all of the through holes 331, 332, 333, 334, 335, 336, 337 are the same diameter, which is slightly larger than the standard diameter of the pin 16. In other embodiments, some or all of the through holes 331, 332, 333, 334, 335, 336, 337 have a different diameter. For example, in applications where the pin 16 is to have a cut length corresponding to the gauge portions 321, 322, 323, and 324, the pin 16 may have a diameter of X and, accordingly, the through holes 331, 332, 333, and 334 would have a diameter slightly larger than diameter X. Continuing with this example, in applications where the pin 16 is to have a cut length corresponding to the gauge portions 325, 326, and 327, the pin 16 may have a diameter of Y and, accordingly, the through holes 335, 336, and 337 would have a diameter slightly larger than diameter Y. Although the above example specifies certain though holes having the same diameter, it is noted that other combinations of through hole diameters are also included in the disclosure.

Figure 4:
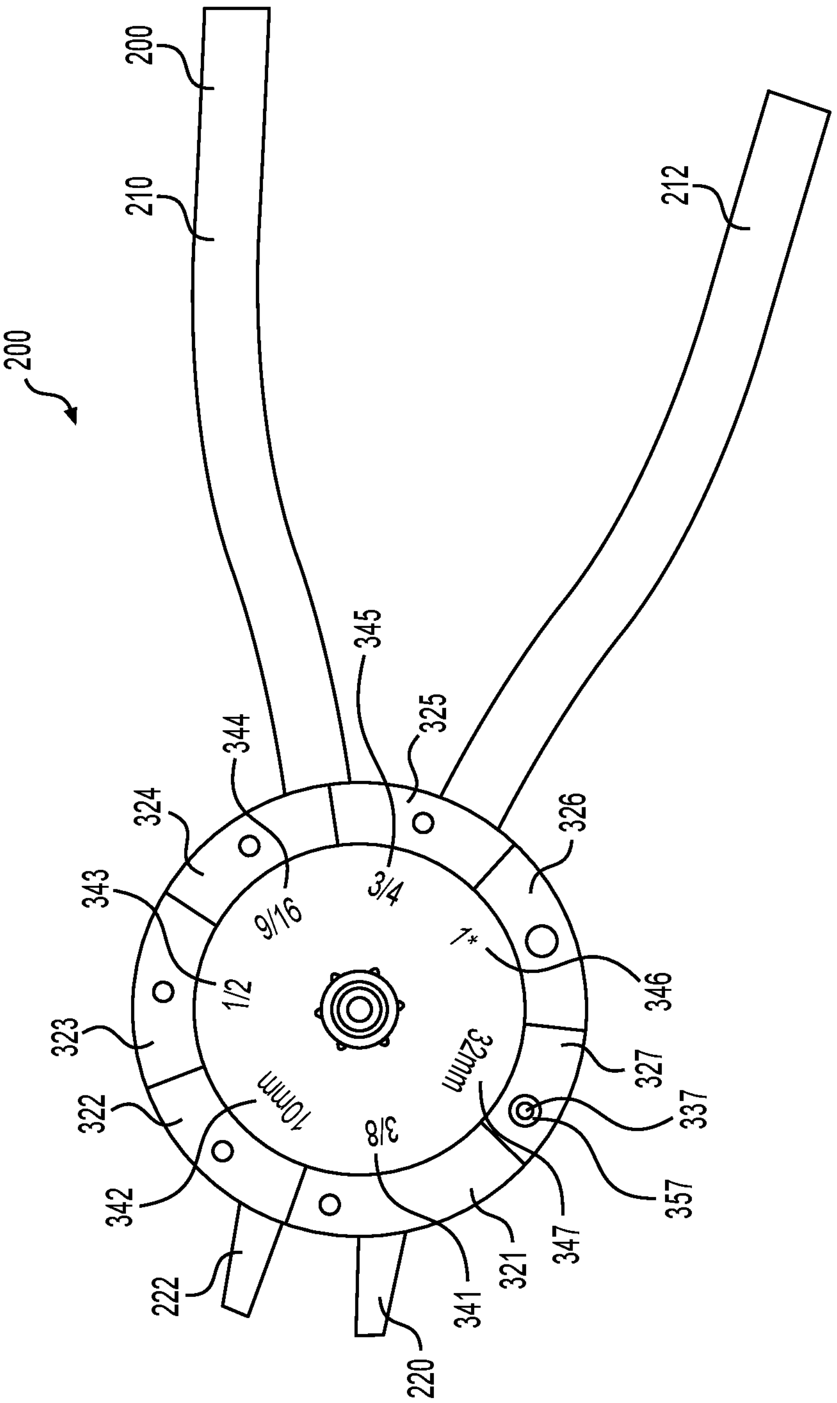
FIG. 4 is a side view of the cutting tool of FIG. 1.

In the embodiment shown in FIGS. 3 and 4, the gauge portion 327 has a recess 357 in its surface that surrounds the through hole 337. The recess 357 is provided to allow a portion of particular connectors to be positioned below the surface of the gauge portion 327 so that a different portion of the connector contacts the surface of the gauge portion 327 and, therefore, determines the cutting length of the pin. Although the recess 357 is shown as a circular recess, the recess 357 can be shapes other than circular. Further, although only gauge portion 327 is shown having a recess, in other embodiments none, two, or more of the gauge portions have a recess.

In the example shown in FIGS. 2 and 3, the boundaries between the gauge portions 321, 322, 323, 324, 325, 326, 327 are right-angled steps. In other embodiments, one or more of the boundaries between the gauge portions 321, 322, 323, 324, 325, 326, 327 are smooth transitions or have other shapes other than right-angled steps. Although the example shown in FIGS. 2 and 3 includes seven of the gauge portions 321, 322, 323, 324, 325, 326, 327, other examples include fewer or more of the gauge portions. For example, for applications for use with connectors 10 having a large front end of the front nut assembly 12, the positioning portion 300 may be limited to a smaller number, for example, four, of the gauge portions in order to allow the pin 16 to be fully inserted into the desired through hole.

FIG. 4 is a side view of the tool 100 showing a plurality of markings 341, 342, 343, 344, 345, 346, 347 that indicate the length of the pin 16 after cutting when using the corresponding through hole 331, 332, 333, 334, 335, 336, 337. In this example, the through holes 331, 332, 333, 334, 335, 336, 337 correspond to cut pin lengths of ⅜", 10 mm, ½", 9⁄16", ¾", 1", and 32 mm, respectively. Other embodiments have different markings corresponding to different cut pin lengths. Other embodiments have markings other than the linear measurement of the cut pin such as, for example, alpha-numeric symbols such as "1, 2, 3, 4 . . . " or "A, B, C, D . . . " that represent known lengths of the cut pin.

Figure 5:
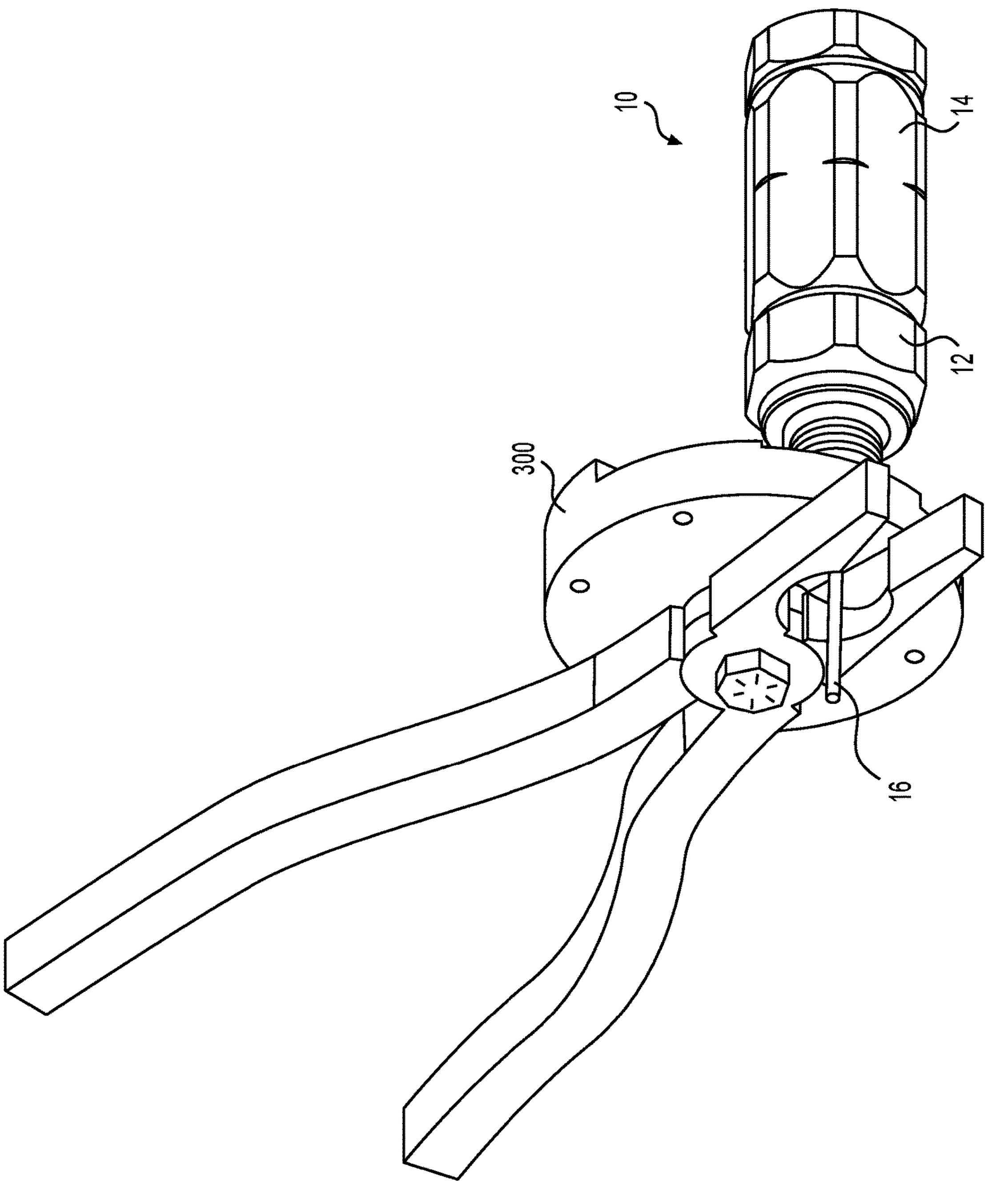
FIG. 5 is a perspective view of the cutting tool of FIG. 1 showing a connector positioned in the tool.
Figure 6:
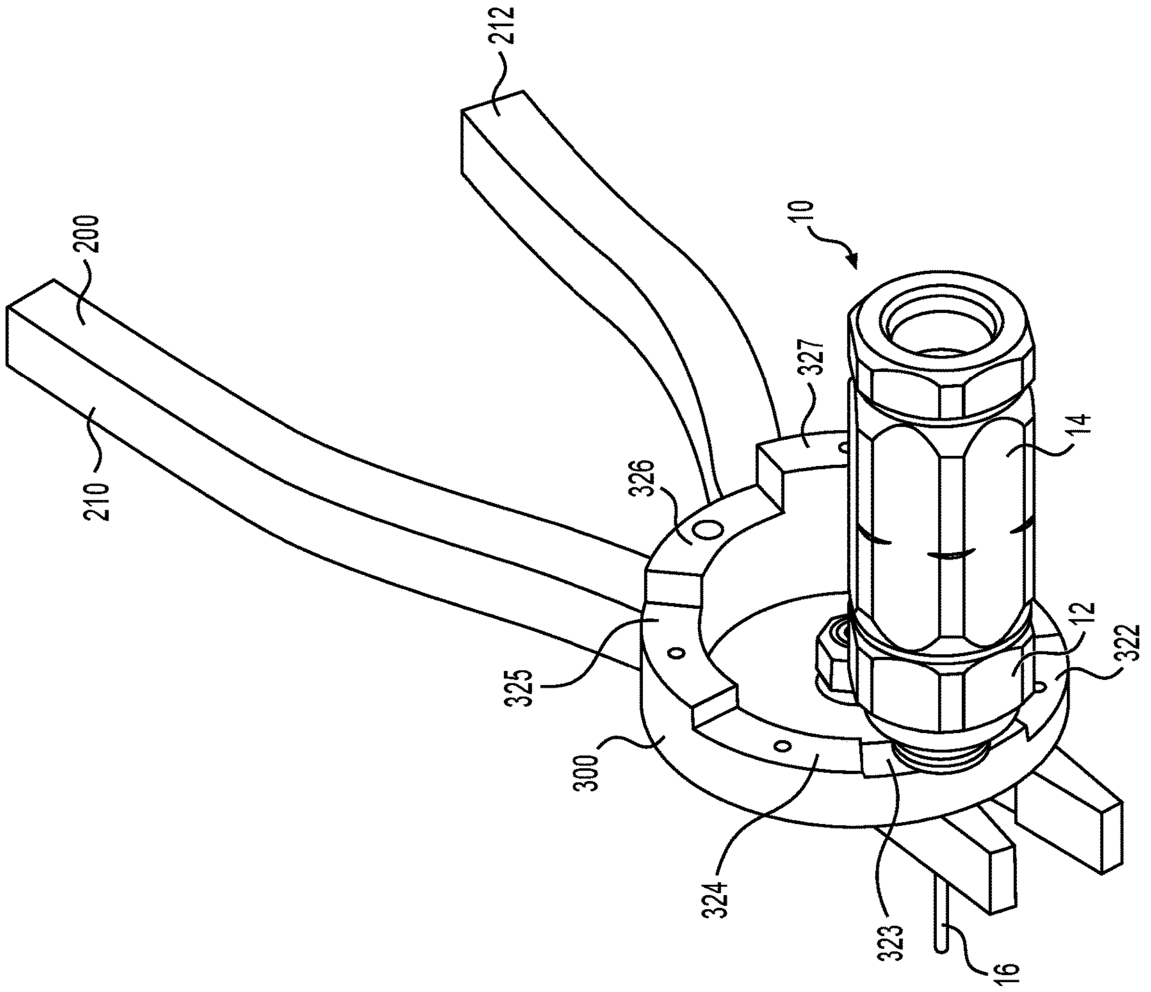
FIG. 6 is a perspective view of the cutting tool of FIG. 1 showing a connector positioned in the tool.

Operation of the tool 100 will now be described with reference to FIGS. 5 and 6. Initially, the pin 16 of the connector 10 is inserted into the through hole that corresponds to the chosen cut length of the pin 16. In the example shown, the pin 16 is inserted into the through hole 333 in the gauge portion 323 of the positioning portion 300. The connector 10 is moved toward the gauge portion 323 to the point where a front surface of the front nut assembly 12 contacts the gauge portion 323 and the pin 16 is fully inserted into the through hole 333. The first arm 210 and the second arm 212 are then pressed toward each other by the user to bring the cutting blade 230 and the cutting surface 232 into contact with the pin 16. Continued pressure is applied to the first arm 210 and the second arm 212 until the pin is completely cut, which results in a cut length to the pin 16 being equal to the chosen length.

An advantage of the configuration of the tool 100 is that as long as the pin 16 is inserted into the correct through hole, the pin 16 cannot be cut too short. If the user fails to fully insert the pin 16 into the through hole (resulting in a longer than desired pin length), the user can simply insert the pin 16 fully into the through hole and cut the pin 16 a second time, which will result in the correct cut pin length.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Various changes to the foregoing described and shown structures will now be evident to those skilled in the art. Accordingly, the particularly disclosed scope of the invention is set forth in the following claims.

What is claimed is:

1. A device for providing enhanced electrical performance of a connector comprising:
- an enhanced cutting assembly comprising:
  - a cutter portion comprising:
    - a first gripping portion that comprises a cutting portion; and
    - a second gripping portion that is structurally arranged to be pivotally attached to the first gripping portion and comprises a cutting surface;
  - a positioning portion that comprises a first gauge portion and a second gauge portion;
  - an attaching member that is structurally arranged to attach the positioning portion to the cutter portion;
- wherein the first gauge portion and the second gauge portion are a single integral piece;
- wherein the cutting surface is structurally arranged to receive a pin of a connector to be cut between the cutting surface and the cutting portion;
- wherein the first gauge portion comprises a first through hole that is structurally arranged to receive a pin of a connector and the second gauge portion comprises a second through hole that is structurally arranged to receive a pin of a connector;
- wherein the attaching member is structurally arranged to extend along a central axis that extends along a central axis direction;
- wherein an entirety of the positioning portion is structurally arranged to rotate relative to the first gripping portion and the second gripping portion around the central axis during tool operation between a first position and a second position;
- wherein the first gauge portion has a first gauge thickness dimension that is structurally arranged to extend in a direction that is predominantly parallel to the central axis direction;
- wherein the first gauge thickness dimension of the first gauge portion is structurally arranged to correspond to a first predetermined cut length of a pin of a connector;
- wherein the second gauge portion comprises a second gauge thickness dimension that is different from the first gauge thickness dimension of the first gauge portion; and
- wherein the cutting assembly is structurally arranged to provide enhanced electrical performance of the connector by permitting the cutter portion to rotate relative to the positioning portion so as to cut a pin of a connector received by the positioning portion to different predetermined cut lengths in different positions of the positioning portion relative to the cutter portion.

2. The tool of claim 1, wherein the first predetermined cut length equals the first gauge thickness dimension of the first gauge portion plus a distance between an edge of the cutting portion and the first gauge portion.

3. The tool of claim 1, wherein the first through hole that is structurally arranged to extend in a direction predominantly parallel to the central axis direction.

4. The tool of claim 1, wherein the positioning portion includes a marking portion that indicates a thickness of the first gauge portion.

5. The tool of claim 4, wherein the marking portion is structurally arranged to provide a measurement of the first predetermined cut length.

6. The tool of claim 1, wherein the positioning portion is structurally arranged to be rotated to align the first through hole with a gap between the cutting portion and the cutting surface.

7. The tool of claim 1, wherein the first gauge portion comprises a recess portion that is structurally arranged to allow at least a portion of the first through hole to pass there through, and the recess portion is structurally arranged to receive a portion of a connector other than a pin.

8. The tool of claim 1, wherein the first and second gripping portions are structurally arranged to move toward each other such that the cutting portion cuts a pin of a connector against the cutting surface to reduce a length of a pin of a connector to the first predetermined cut length.

9. The tool of claim 1, wherein the cutting portion is a cutting blade.

10. The tool of claim 1, wherein the first through hole is structurally arranged to receive a pin of a coaxial cable connector.

11. The tool of claim 1, wherein the first though hole is structurally arranged to receive a pin of a hardline connector.

12. The tool of claim 1, wherein the positioning portion is structurally arranged to overlap a cutting edge of the cutter portion.

13. A device for providing enhanced electrical performance of a connector comprising:

an enhanced cutting assembly comprising:

a cutter portion comprising a first gripping portion and a second gripping portion;

a positioning portion comprising a first gauge portion and a second gauge portion;

wherein the first gauge portion and the second gauge portion are a single integral piece;

wherein the cutter portion is structurally arranged to receive a pin of a connector to be cut by the cutter portion;

wherein the first gauge portion comprises a first through hole that is structurally arranged to receive a pin of a connector and the second gauge portion comprises a second through hole that is structurally arranged to receive a pin of a connector;

wherein the positioning portion is structurally arranged to extend along an axis that extends along a positioning portion axis direction;

wherein an entirety of the positioning portion is structurally arranged to rotate relative to the first gripping portion and the second gripping portion around the axis between a first position and a second position;

wherein the first gauge portion has a first gauge thickness dimension that is structurally arranged to extend in a direction that is predominantly parallel to the positioning portion axis direction;

wherein the first gauge thickness dimension of the first gauge portion is structurally arranged to correspond to a first predetermined cut length of a pin of a connector;

wherein the second gauge portion has a second gauge thickness dimension, and the first gauge thickness dimension is greater than the second gauge thickness dimension; and wherein the cutting assembly is structurally arranged to provide enhanced electrical performance of the connector by permitting the cutter portion to rotate relative to the positioning portion so as to cut a pin of a connector received by the positioning portion to different predetermined cut lengths in different positions of the positioning portion relative to the cutter portion.

14. The tool of claim 13, further comprising an attaching portion that is structurally arranged to attach the positioning portion to the cutter portion.

15. The tool of claim 13, wherein the cutter portion comprises a cutting portion that is structurally arranged to be pivotably attached to a cutting support portion.

16. The tool of claim 15, wherein the cutting portion is a cutting blade.

17. The tool of claim 13, wherein the first predetermined cut length equals the thickness of the first gauge portion plus a distance between a cutting edge of the cutter portion and the first gauge portion.

18. The tool of claim 13, wherein the first through hole is structurally arranged to extend in a direction that is predominantly parallel to the positioning portion axis direction.

19. The tool of claim 13, wherein the first through hole is structurally arranged to receive a pin of a coaxial cable connector.

20. The tool of claim 13, wherein the first through hole is structurally arranged to receive a pin of a hardline connector.

21. The tool of claim 13, wherein the positioning portion is structurally arranged to overlap a cutting edge of the cutter portion.

22. A device for providing enhanced electrical performance of a connector comprising:

an enhanced cutting assembly comprising:

a cutter portion;

a positioning portion comprising a first gauge portion and a second gauge portion;

wherein the first gauge portion and the second gauge portion are a single integral piece;

wherein the cutter portion is structurally arranged to receive a pin of a connector to be cut by the cutter portion;

wherein the first gauge portion comprises a first through hole structurally arranged to receive a pin of a connector and the second gauge portion comprises a second through hole that is structurally arranged to receive a pin of a connector;

wherein an entirety of the positioning portion is structurally arranged to rotate relative to an entirety of the cutter portion between a first position and a second position;

wherein the first gauge portion comprises a first gauge thickness dimension that is structurally arranged to correspond to a first predetermined cut length of a pin of a connector;

wherein the second gauge portion comprises a second gauge thickness dimension that is structurally arranged to correspond to a second predetermined cut length of a pin of a connector;

wherein the first predetermined cut length and the second predetermined cut length are different; and wherein the cutting assembly is structurally arranged to provide enhanced electrical performance of the connector by permitting the cutter portion to rotate relative to the positioning portion so as to cut a pin of a connector received by the positioning portion to different predetermined cut lengths in different positions of the positioning portion relative to the cutter portion.

23. The tool of claim 22, wherein the thickness of the first gauge portion is in a direction parallel to a rotational axis of the positioning portion.

24. The tool of claim 22, wherein the cutter portion comprises a first gripping portion and a second gripping portion, and wherein the first and second gripping portions are structurally arranged to move toward each other such that a cutting blade cuts a pin of a connector against a cutting surface so as to reduce a length of a pin of a connector to the first predetermined cut length.

25. The tool of claim 22, wherein the first through hole is configured to extend in a direction at least predominantly parallel to a rotational axis of the positioning portion.

26. The tool of claim 22, wherein the first through hole is configured to receive a pin of a coaxial cable connector.

27. The tool of claim 22, wherein the first through hole is structurally arranged to receive a pin of a hardline connector.

28. The tool of claim 22, wherein the positioning portion is structurally arranged to overlap a cutting edge of the cutter portion.

29. A device for providing enhanced electrical performance of a connector comprising:

an enhanced cutting assembly comprising:

a cutter portion structurally arranged to receive and cut a pin of a connector;

a positioning portion structurally arranged such that an entirety of the positioning portion is structurally arranged to rotate relative to an entirety of the cutter portion between a first position and a second position;

wherein the positioning portion comprises a singular integral piece having a first gauge portion and a second gauge portion;

wherein the first gauge portion comprises a first through hole structurally arranged to receive a pin of a connector and the second gauge portion comprises a second through hole that is structurally arranged to receive a pin of a connector;

wherein the first gauge portion and the second gauge portion comprise different gauge thickness dimensions that are structurally arranged to correspond to different predetermined cut lengths of a pin of a connector; and wherein the cutting assembly is structurally arranged to provide enhanced electrical performance of the connector by permitting the cutter portion to rotate relative to the positioning portion so as to cut a pin of a connector received by the positioning portion to the different predetermined cut lengths in different positions of the positioning portion relative to the cutter portion.

30. The tool of claim 29, wherein the thickness of the first gauge portion is in a direction parallel to a rotational axis of the positioning portion.

31. The tool of claim 29, wherein the cutter portion comprises a first gripping portion and a second gripping portion, and wherein the first and second gripping portions are structurally arranged to move toward each other such that a cutting blade cuts a pin of a connector against a cutting surface so as to reduce a length of a pin of a connector to the first predetermined cut length.

32. The tool of claim 29, wherein the first through hole is configured to extend in a direction at least predominantly parallel to a rotational axis of the positioning portion.

33. The tool of claim 29, wherein the first through hole is configured to receive a pin of a coaxial cable connector.

34. The tool of claim 29 wherein the first through hole is structurally arranged to receive a pin of a hardline connector.

35. The tool of claim 29, wherein the positioning portion is structurally arranged to overlap a cutting edge of the cutter portion.

* * * * *